United States Patent
Sommerfeld

(10) Patent No.: US 7,461,869 B2
(45) Date of Patent: Dec. 9, 2008

(54) AIR BRAKE HOSE COUPLING WITH LOCKING DEVICE

(75) Inventor: Howard Sommerfeld, Oak Forest, IL (US)

(73) Assignee: WABTEC Holding Corp., Wilmerding, PA (US)

(*) Notice: Subject to any disclaimer, the term of this patent is extended or adjusted under 35 U.S.C. 154(b) by 0 days.

(21) Appl. No.: 11/728,249

(22) Filed: Mar. 23, 2007

(65) Prior Publication Data
US 2007/0170718 A1 Jul. 26, 2007

Related U.S. Application Data

(62) Division of application No. 11/201,889, filed on Aug. 11, 2005.

(60) Provisional application No. 60/604,580, filed on Aug. 26, 2004.

(51) Int. Cl.
*B61G 5/06* (2006.01)
*B60D 1/62* (2006.01)
*F16B 23/00* (2006.01)

(52) U.S. Cl. .................. 285/69; 285/62; 285/63; 285/65; 285/68; 285/78

(58) Field of Classification Search ........ 292/175, 292/145, 262, 58, 61, DIG. 17; 285/61, 62, 285/63, 65, 68, 69, 78
See application file for complete search history.

(56) References Cited

U.S. PATENT DOCUMENTS

| | | | | |
|---|---|---|---|---|
| 1,112,850 A | * | 10/1914 | Sherer | 285/79 |
| 2,501,639 A | * | 3/1950 | Warren | 285/147.2 |
| 3,892,431 A | * | 7/1975 | Booth | 285/79 |
| 3,941,254 A | * | 3/1976 | Sweger | 213/76 |
| 4,129,323 A | * | 12/1978 | Wilson | 285/69 |
| 4,747,623 A | * | 5/1988 | Newcomb et al. | 285/69 |
| 5,388,864 A | | 2/1995 | Kozinski | |
| 5,911,444 A | | 6/1999 | Bucher et al. | |
| 5,971,442 A | * | 10/1999 | Kozinski et al. | 285/69 |
| 6,669,237 B1 | | 12/2003 | Burch et al. | |

* cited by examiner

*Primary Examiner*—James M Hewitt
*Assistant Examiner*—Jay R Ripley
(74) *Attorney, Agent, or Firm*—James Ray & Assoc.

(57) ABSTRACT

"An air brake hose coupling member includes a locking device having a housing with a first aperture for attachment to the air brake hose coupling member and a second aperture for attachment to a hose support member which is adjusted to provide a predetermined clearance between the air brake hose coupling and a rail track. A locking pin is mounted for reciprocal movement within the housing and is being urged. by a resilient member in one direction for preventing undesirable complete rotational uncoupling of such pair of mating air brake hose coupling members. The locking pin is manually movable in the opposite direction during coupling and uncoupling under normal operating conditions. Alternatively, the housing is provided as a boss formed on a body of the air brake hose coupling."

11 Claims, 3 Drawing Sheets

AIR BRAKE HOSE COUPLING WITH LOCKING DEVICE

CROSS-REFERENCE TO RELATED APPLICATIONS

This application is a Divisional Application of co-pending patent application Ser. No. 11/201,889 filed Aug. 11, 2005.

This application is related to and claims priority from U.S. Provisional patent application Ser. No. 60/604,580 filed on Aug. 26, 2004.

FIELD OF THE INVENTION

The present invention relates, in general, to air brake hose couplings commonly called "glad hands" which detachably connect the ends of air brake hoses and, more particularly, this invention relates to a locking device for such air brake hose couplings which prevents unintended complete rotational uncoupling thereof and, yet more particularly, the instant invention relates to a locking device for preventing unintended separation of coupled air brake hoses for railroad cars and/or trucks.

BACKGROUND OF THE INVENTION

The following background information is provided to assist the reader to understand the environment in which the invention will typically be used. The terms used herein are not intended to be limited to any particular narrow interpretation unless specifically stated otherwise in this document.

Operation of the pneumatic brake system on railroad cars and certain types of trucks employ flexible air hoses extending between separate railroad cars or between the truck tractor and the trailer. Outer ends of the flexible air hoses are terminated with mating coupling members enabling ease of hose attachment and detachment. One of these couplings, commonly known as a glad hand coupling, is widely used in such applications. Such glad hand couplings are designed and manufactured to meet various standards and, in particular, to meet the standards of Association of American Railroads, so as to ensure ease of interchangeability between various manufacturers.

For connecting opposite ends of the air hoses in an air tight manner, these air brake hose couplings are joined by a rotational movement enabling engagement of mating lugs and flanges extending from each coupling body and forming an air tight passage between two air hoses. As it well known, in applications for railroad cars, such connection is located between the opposed ends of two coupled railroad cars and is also located in close proximity to the ground surface as each hose is suspended by an adjustable hose support which is attached to the air brake hose coupling at one end and to a respective railroad car coupler at a distal end. The, hose support must be adjusted for each individual air brake hose coupling connection to maintain a predetermined clearance with the ground surface.

In operation, the air pressure communicated through the connected air lines maintains air brakes of the individual railroad cars in the released position with any loss of the air pressure resulting in a brake application and, more importantly, if unintended may result in unwanted and undesired stopping of the entire train consist.

If the hose support adjustment has not been properly executed, it will result in the air brake hose coupling connection being disposed too close to the ground surface which is subject to premature uncoupling when struck by a raised object, for example a grade crossing or the like, lying between the tracks. Such premature uncoupling results in previously described undesired emergency braking.

To prevent unwanted braking, locking devices of various types have been employed to prevent separation of the air brake hose coupling.

U.S. Pat. No. 5,971,442 to Kozinski et al; U.S. Pat. Nos. 5,388,864 and 3,879,066, both to Kozinski disclose a flange protruding outwardly and forwardly from a rear portion of a housing and is provided with a lip engaging a similar lip formed on the arcuate locking lug of the other housing.

U.S. Pat. No. 5,911,444 to Buchter et al teaches a stop assembly having a spring loaded pin disposed within a bore of a first coupling housing. Pressurization of the brake system causes movement of the stop assembly to obstruct a path of the mating coupling housing thereby preventing rotational uncoupling of the housings.

U.S. Pat. No. 3,892,431 to Booth; and U.S. Pat. No. 1,354,643 to Brower disclose a spring loaded pin being disposed within a bore of a coupling housing and engaging either a hole, slot or a socket.

Such prior art designs require complete replacement of the installed air brake hose coupling with a new type design thus substantially increasing the costs of providing anti-rotational capability.

U.S. Pat. No. 6,669,237 to Burch et al teaches a pivotally mounted pawl mounted to one coupling member and having a ramp for engaging the other coupling member.

U.S. Pat. No. 5,685,573 to Nadherny et al discloses a band assembly having a strap attached to an air hose and oriented in a predetermined relationship to the first air brake hose coupling and an anti-rotational wire attached to the strap at one end and having a second end engaging the lip of a mating air brake hose coupling to prevent rotational uncoupling.

U.S. Pat. No 5,251,666 to Kimball et al discloses a fork like locking member mounted to reciprocate on the coupling body adjacent one of the flanges between release and engaged positions and a leaf spring urging such locking member into the engage position to prevent passage of a corresponding flange of the other coupling body.

U.S. Pat. No 4,747,623 to Newcomb et al teaches an attachment secured to one part of the air brake hose coupling which includes a rigid blocking member having a yoke and a blocking pin installed through such yoke and being held with a releasable wire bail or tether. The blocking pin prevents rotation of the coupling section.

Such prior art designs require costly field modifications of the existing air brake hose couplings.

Therefore, there is a need for a simple and reliable locking device for a pair of mating air brake hose couplings which can be easily installed without the need for special tools or modifications of the existing couplings.

SUMMARY OF THE INVENTION

The present invention provides a locking device for a pair of mating air brake hose coupling members, commonly known as glad hands. In one embodiment, such locking device is installed intermediate one air brake hose coupling and a hose support member which is adjusted to provide a predetermined clearance between the air brake hose coupling and a railway track or a road surface. Such locking device includes a housing with a first aperture for attachment to the air brake hose coupling and a second aperture for attachment to the hose support member. A locking pin is reciprocally disposed within the housing and is being urged by a compressible resilient member, such as a spring, in one direction for preventing undesirable complete rotational uncoupling of such pair of mating air brake hose coupling members. The locking pin is manually movable in the opposite direction during coupling and uncoupling under normal operating conditions. To facilitate manual movement of the locking pin, a handle is attached to one end thereof and extends outwardly from the housing. The handle may be further used to move the locking pin in both directions and eliminate the need for the compressible resilient member.

In another embodiment, the housing portion is formed integral to the body of the air brake hose coupling.

Objects of the Invention

It is therefore one of the primary objects of the present invention is to provide a locking device for a pair of mating air brake hose couplings.

A further object of the present invention is to provide a locking device for a pair of mating air brake hose couplings which is suitable for installation on any standard AAR air brake hose coupling.

Another object of the present invention is to provide a locking device for a pair of mating air brake hose couplings which prevents undesirable complete rotational uncoupling during normal operation.

Yet another object of the present invention is to provide a locking device for a pair of mating air brake hose couplings which does not require use of special installation tools.

An additional object of the present invention is to provide a locking device for a pair of mating air brake hose couplings which enables ease of manual coupling and uncoupling.

These and various other objects and advantages of the present invention will become more readily apparent to those persons skilled in the relevant art from the following more detailed description, particularly, when such description is taken in conjunction with the attached drawings and the appended claims.

Figure 1:
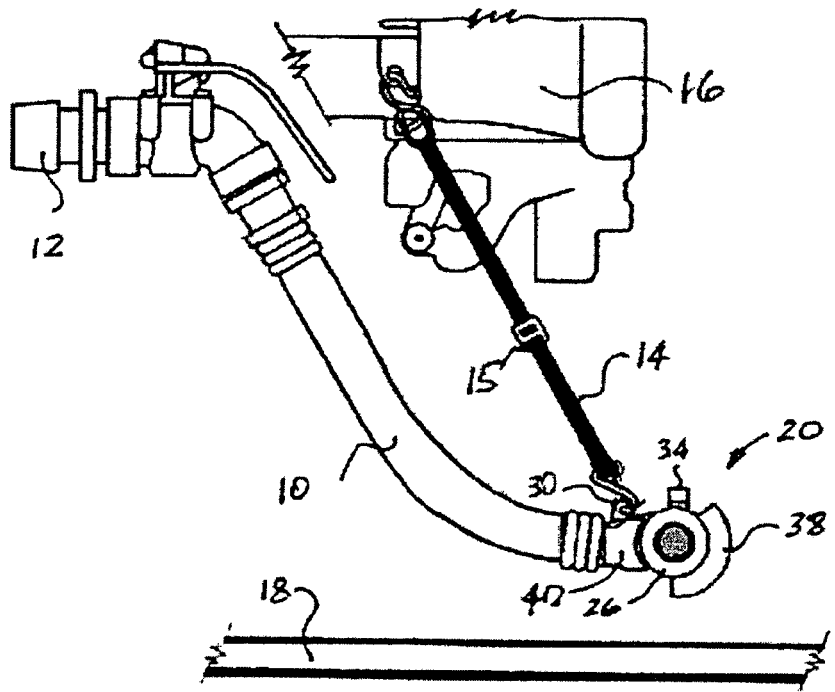
FIG. 1 is a side elevation view of a conventional air brake house coupling member and a suspension thereof.

DESCRIPTION OF THE PRESENTLY PREFERRED AND VARIOUS ALTERNATIVE EMBODIMENTS OF THE INVENTION

Prior to proceeding to the more detailed description of the present invention, it should be noted that for the sake of clarity identical components, having identical functions have been identified with identical reference numerals throughout the several views, which have been illustrated in the drawing figures.

In reference to FIG. 1, therein illustrated a prior art air brake hose assembly 10 having a first end connected to an air brake system 12 of a rail car (not shown) and having a second end terminated with an air brake hose coupling, generally designated 20. Such air brake hose assembly 10 is suspended by a hose support 14 having a first end connected to a coupler 16 of the rail car and having a second end connected to the air brake hose coupling 20. An adjustment means 15 may be provided within hose support 14 for maintaining the air brake hose coupling 20 at a predetermined distance from a rail 18.

The air brake hose coupling 20 includes a generally tubular body 22 with a longitudinal axis 24 and an inner coupling face 26 at a first end that is aligned generally in a plane parallel to the longitudinal axis 24 and extending around an air passage (not shown). A neck 28 extends from a second end of the tubular body 22 for connection to air brake hose assembly 10. There is a mounting flange 30 formed on tubular body 22 adjacent neck 28 which is provided with an aperture 32 for connection to the second end of hose support 14. A stop 34 is formed on tubular body 22 and extends outwardly therefrom. The stop 34 may be provided with a V-shaped notch 36. The air brake hose coupling 20 further includes an arcuate locking flange 38 projecting outwardly from the first end of tubular body 22 and an L-shaped annular flange 40 formed on the tubular body 22 which projects outwardly from a top portion thereof.

Figure 4:
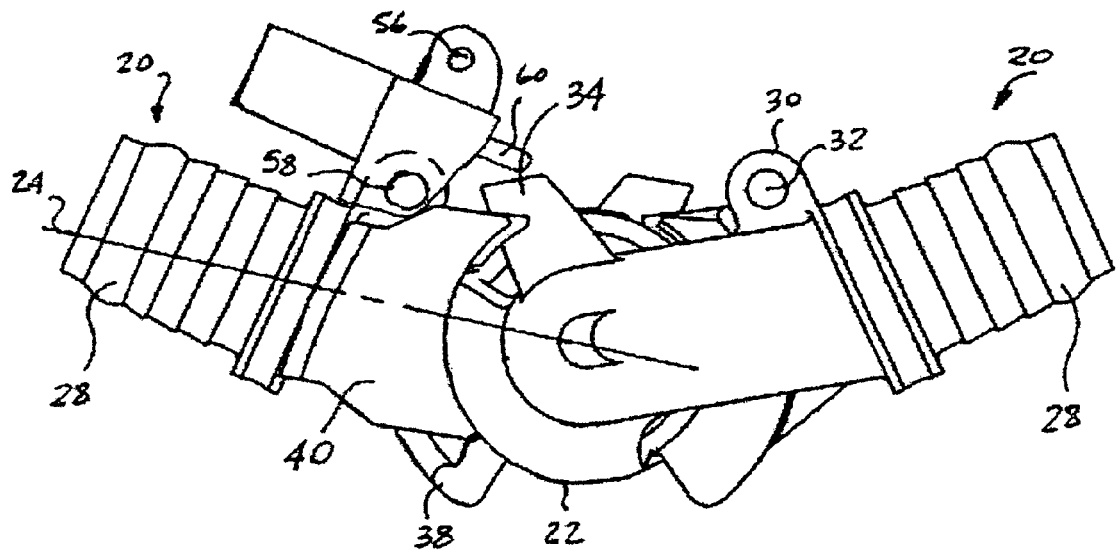
"FIG. 4 is a planar elevation view a locking device of the present invention as installed on a pair of conventional air brake hose coupling members in their locked position.

In operation, the arcuate locking flange 38 and the L-shaped annular flange 40 are adapted to engage with an L-shaped annular flange and an arcuate locking flange, respectively, of another air brake hose coupling member to couple the members together when inner coupling faces of the two coupling members are placed in an abutting relationship substantially along their entire inner coupling faces and rotated with respect to each other into the locked position, as best shown in FIG. 4. In such locked position, one end of the arcuate locking flange 38 of one air brake hose coupling member 20 generally engages the V-shaped notch 36 of the stop 34 of the second air brake hose coupling member 20.

Now in reference to FIGS. 2-5, therein is illustrated an air brake hose locking device, generally designated 50, of the present invention. In reference to FIG. 3, such air brake hose locking device 50 comprises a housing 52 with a first attachment means 56, preferably being a first aperture 56, for attaching the locking device 50 to an aperture 32 of flange 30. The presently preferred material for housing 52 is metal. To accommodate variations between different air brake coupling types, the first aperture 56 may be round, elongated or accurately shaped. A second attachment means 58, preferably being a second aperture 58 is provided for attaching the locking device 50 to the hose support member 14.

In the presently preferred embodiment, a locking member 60 is disposed within a cavity 54 of the housing 52 having an open end 55. The longitudinal axis of the cavity 54 is preferably aligned substantially parallel to the longitudinal axis 24 of the tubular body 22.

The locking member 60 is adapted for reciprocal longitudinal movement in a first direction and second direction. The locking member 60, which is preferably a simple pin 60 formed from a metallic material, is urged in such first direction by a compressible resilient member 62 abutting one end thereof. Preferably, such compressible resilient member 62 is a spring means 62 disposed coaxially with the movement of the locking member 60. Alternatively, such compressible resilient member 62 may be a compressible elastomer (not shown).

To facilitate manual movement of the locking pin 60 in the first direction, the locking device 50 may further include a grip means 66 connected to the locking pin 60. Preferably, such grip means 66 is a handle 66 protruding through a second end 64 of the cavity 54 and extending outwardly from such housing 52. The compressible resilient member 62 may be installed externally of the housing 52 and caged between such housing 52 and the portion of the grip means 66 or caged between the grip means 66 and the locking member 60.

Furthermore, to reduce frictional forces during movement of the locking pin 60, a liner 68 formed from a material with a low coefficient of friction may be disposed within the cavity 54 intermediate a wall thereof and the outer surface of the locking pin 60. Alternatively, a coating containing such material with a low coefficient of friction may be applied to one of such wall of the cavity 54, such outer surface of the locking pin 60 and a combination thereof. Yet alternatively, the locking pin 60 or the housing 52 may be formed from such material with a low coefficient of friction.

Figure 2:
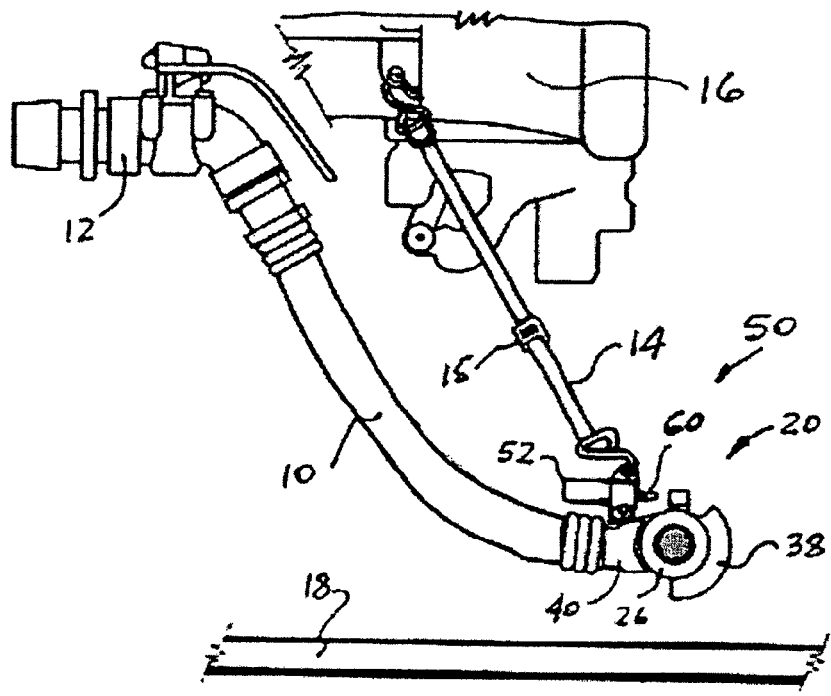
FIG. 2 is a side elevation view of a locking device of the present invention as installed on a conventional air brake hose coupling member.
Figure 3:
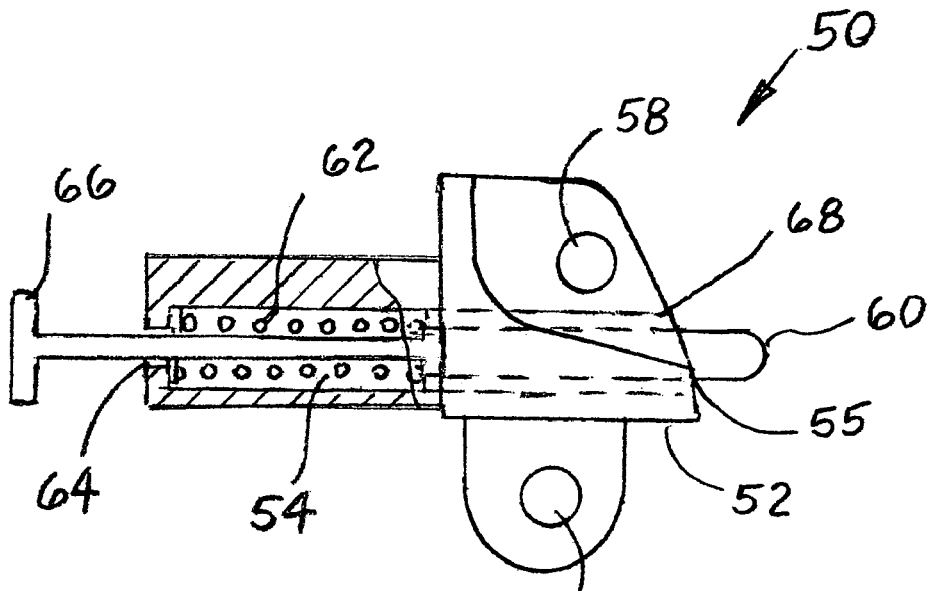
FIG. 3 is a plan view of a locking device of the present invention.

In operation, as best seen in FIG. 2, the air brake hose locking device 50 is installed intermediate the air brake hose coupling 20 and the hose support 14 by attaching it to the aperture 32 of the mounting flange 30 with standard mounting hardware components (not shown). It will be appreciated that the hose support 14 is reattached to the aperture 56 of the locking device 50 and is readjusted by the adjustment means 15 to maintain the air brake hose coupling 20 at a predetermined distance from the rail 18.

When the locking device 50 is installed prior to coupling of the pair of airbrake hose couplings 20, the locking pin 60 is manually moved in a first direction for enabling placement of such pair of air brake hose coupling members 20 in an abutting relationship substantially along their entire inner coupling faces 26 and for enabling their rotation with respect to each other into a locked position as shown in FIG. 4. After such pair of air brake hose coupling members 20 are rotated with respect to each other into a locked position, locking pin 60 is released and moved in a second direction by spring means 62 for preventing an uncoupling of such pair of air brake hose coupling members 20.

Figure 5:
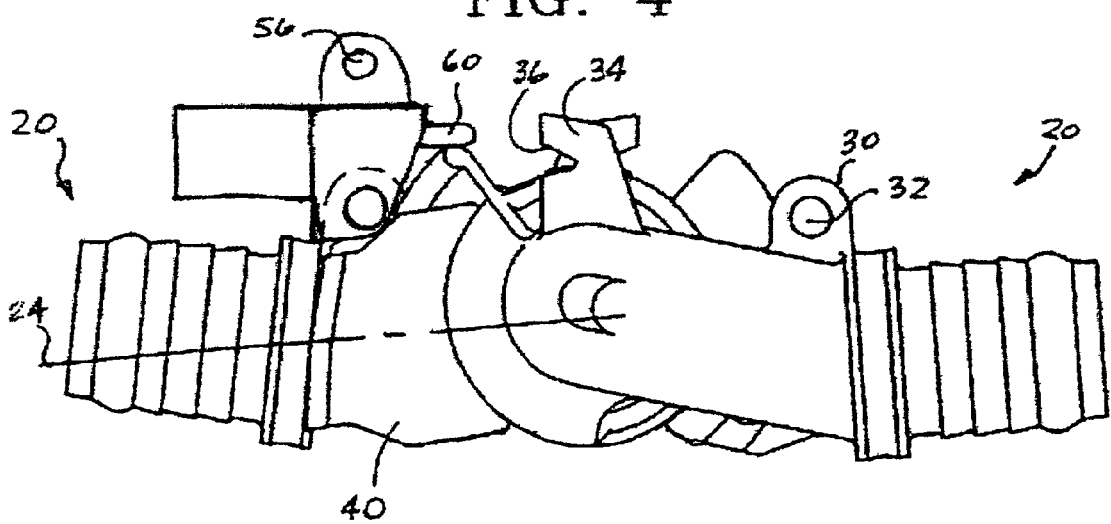
FIG. 5 is a planar elevation view a locking device of the present invention as installed on a pair of conventional air brake hose coupling members moved towards their unlocked position.

Preferably, to accommodate various coupling designs presently in use and provide for an improved operation, the locking device is mounted to allow for partial rotational uncoupling of such pair of air brake hose coupling members 20 without the loss of air pressure communicated through the connected air brake hoses 10. As best seen in FIG. 5, locking pin 60 will abut the end of the arcuate locking flange 38 at the end of such partial rotational uncoupling thus preventing the complete rotational uncoupling of such pair of air brake hose coupling members 20.

When it is desired to uncouple the air brake hoses 10, the locking pin 60 is manually moved in the first direction enabling the rotational uncoupling of the coupling members 20.

It will be appreciated that installation of the air brake hose locking device 50 of the present invention does not require special tools, as attachment thereof to the air brake hose coupling 20 is accomplished with standard hardware components, for example a bolt and a nut.

Although the present invention has been shown in terms of a locking device used for connecting air brake hose assemblies of a pair of rail cars, it will be apparent to those skilled in the art, that the present invention may be applied to air brake hose coupling between a truck tractor and a trailer.

Furthermore, the locking member 60 may be adapted for an arcuate movement within the housing 52. Or alternatively, the locking member 60 may be attached to an outer surface of the housing 52.

Figure 6:
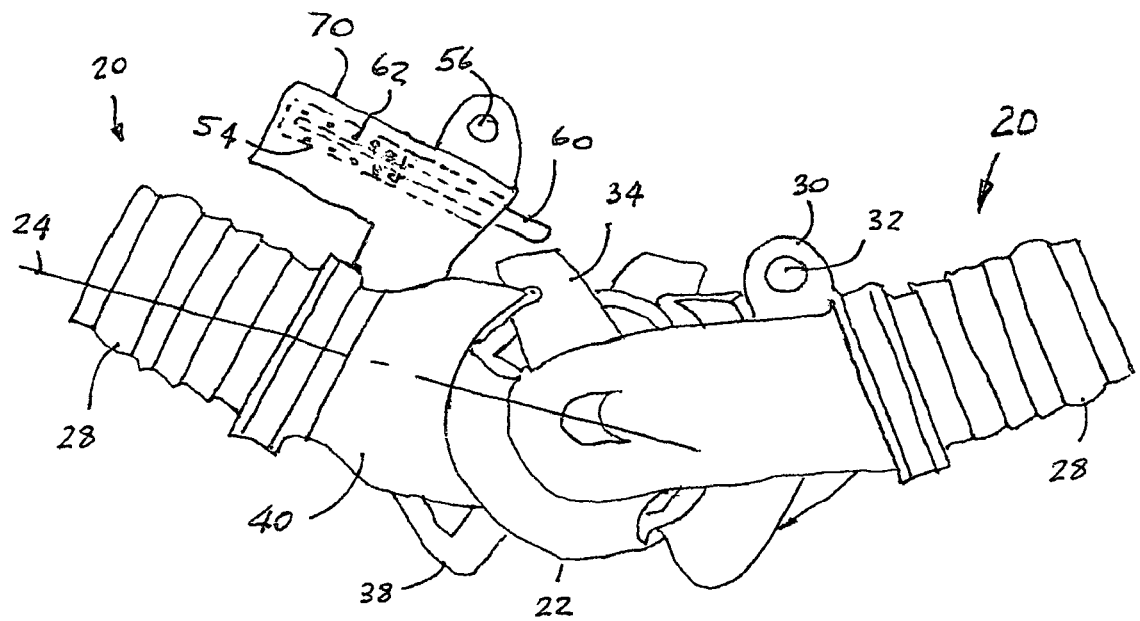
FIG. 6 is a planar elevation view of a pair of conventional air brake hose coupling members in their locked position, particularly illustrating a locking device constructed in accordance with an alternative embodiment of the present invention.

"Additionally, the housing 52 may be formed integral to the generally tubular body 22 of the air brake hose coupling 20 which is advantageous in newly manufactured air brake hose coupling 20 to reduce overall installation costs. Now in reference to FIG. 6, the housing 52 may be simply provided as a boss 70 incorporating the above described cavity 54 and an aperture 56 for attachment to the hose support 14.

It will be understood that the grip means 66 may be utilized for moving the locking pin 60 in a second direction and eliminating the need for the compressible resilient member 62. In such embodiment, the locking device 50 will be adapted for positively retaining such locking member 60 at the end of the movement in the second direction. For example, either the grip means 66 or the locking member 60 may be provided with a thread portion engaging a complimentary threaded cavity 54 or provided with a movement restraining means, such as a clamp, which may be attached to the housing 52.

Although a presently preferred and various alternative embodiments of the present invention have been described in considerable detail above with particular reference to the drawing FIGURES, it should be understood that various additional modifications and/or adaptations of the present invention can be made and/or envisioned by those persons skilled in the relevant art without departing from either the spirit of the instant invention or the scope of the appended claims.

I claim:

1. An air brake hose coupling member for an air brake hose assembly for one of a rail car and truck trailer, such air brake hose being suspendably supported by a hose support member, said air brake hose coupling member comprising:
   (a) a generally tubular body with a longitudinal axis and an inner coupling face at a first end that is aligned generally in a plane parallel to the longitudinal axis and extending around an air passage;
   (b) a neck extending from a second end of said generally tubular body for connection to such air brake hose;
   (c) a flange formed on said generally tubular body adjacent said neck and having an aperture;
   (d) an arcuate locking flange projecting outwardly from said first end of said generally tubular body;
   (e) an annular flange formed on said generally tubular body and projecting outwardly from a top portion thereof, wherein said arcuate locking flange and said annular flange are adapted to engage with an annular flange and an arcuate locking flange, respectively, of another air brake hose coupling member to couple said members together when inner coupling faces of said two coupling members are placed in an abutting relationship substantially along their entire inner coupling faces and rotated with respect to each other into a locked position; and
   (f) a locking means having a first attachment means for attachment to said aperture of said flange and having a second attachment means for attachment to a distal end of such hose support member, said locking means further having a predetermined portion thereof mounted for reciprocal movement in a direction generally parallel to the longitudinal axis of generally tubular body movable in a first direction for enabling said rotation of said two air brake hose coupling members into said locked position, said predetermined portion movable in a second direction, after said two air brake hose coupling members completed said rotation with respect to each other into said locked position, for preventing a rotational uncoupling of said two air brake hose coupling members, whereby a subsequent movement of said predetermined portion in said first direction enables said rotational uncoupling of said two air brake hose coupling members.

2. The air brake hose coupling member, according to claim 1, wherein said locking means includes a housing and said predetermined portion of said locking means is mounted for movement within a cavity disposed within said housing, said cavity being open at one end.

3. The air brake hose coupling member, according to claim 1, wherein said air brake hose coupling member includes a stop formed on said generally tubular body and extending outwardly therefrom.

4. The air brake hose coupling member, according to claim 3, wherein said stop includes a V-shaped notch engaging an end of an arcuate locking flange of an opposed coupling member after said two air brake hose coupling members completed said rotation with respect to each other.

5. The air brake hose coupling member, according to claim 1, wherein said predetermined portion of said locking means is positioned intermediate said first attachment means and said second attachment means.

6. The air brake hose coupling member, according to claim 1, wherein said first attachment means is an aperture.

7. The air brake hose coupling member, according to claim 1, wherein said second attachment means is an aperture.

8. The air brake hose coupling member, according to claim 1, wherein said locking means includes a compressible resilient means for urging said predetermined portion for movement in said second direction.

9. The air brake hose coupling member, according to claim 8, wherein said compressible resilient means is a spring.

10. An air brake hose coupling member for an air brake hose assembly, such air brake hose assembly being suspendably supported by a hose support member attached at one end to one of a rail car and truck trailer, said air brake hose coupling member comprising:
(a) a generally tubular body with a longitudinal axis and an inner coupling face at a first end that is aligned generally in a plane parallel to the longitudinal axis and extending around an air passage;
(b) a neck extending from a second end of said generally tubular body for connection to such air brake hose;
(c) a boss formed on said generally tubular body adjacent said neck, said boss having a cavity formed therein, said cavity being open at one end and having a longitudinal axis aligned generally parallel to said longitudinal axis of said generally tubular body, said boss further having an aperture with a longitudinal axis disposed substantially perpendicular to said longitudinal axis of said generally tubular body, said aperture enables connection of said coupling member to such hose support member;
(d) an arcuate locking flange projecting outwardly from said first end of said generally tubular body;
(e) an annular flange formed on said generally tubular body and projecting outwardly from a top portion thereof, wherein said arcuate locking flange and said annular flange are adapted to engage with an annular flange and an arcuate locking flange, respectively, of another air brake hose coupling member to couple said members together when inner coupling faces of said two coupling members are placed in an abutting relationship substantially along their entire inner coupling faces and rotated in said plane being parallel to said longitudinal axis of said tubular body and with respect to each other into a locked position; and
(f) an elongated member mounted within said cavity for reciprocal movement in a first and a second direction, said elongated member movable in said first direction for enabling said rotation of said two air brake hose coupling members into said locked position, said elongated member movable in said second direction, after said two air brake hose coupling members completed said rotation with respect to each other, for preventing a complete rotational uncoupling of said two air brake hose coupling members, whereby one end of said elongated member moved into said second position is disposed external to said boss and is disposed external a stop formed on a body of an opposed coupling member, and whereby a subsequent movement of said elongated member in said first direction enables said complete rotational uncoupling of said two air brake hose coupling members.

11. The air brake hose coupling member, according to claim 10, wherein said coupling member includes a compressible resilient means disposed within said cavity for urging said elongated member to move in said second direction.

* * * * *